United States Patent
Debe et al.

(10) Patent No.: US 8,557,484 B2
(45) Date of Patent: Oct. 15, 2013

(54) PLATINUM NICKEL CATALYST ALLOY

(75) Inventors: Mark K. Debe, Stillwater, MN (US); George D. Vernstrom, Cottage Grove, MN (US); Andrew J. L. Steinbach, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 13/643,353

(22) PCT Filed: Apr. 26, 2011

(86) PCT No.: PCT/US2011/033949
§ 371 (c)(1),
(2), (4) Date: Oct. 25, 2012

(87) PCT Pub. No.: WO2011/139693
PCT Pub. Date: Nov. 10, 2011

(65) Prior Publication Data
US 2013/0040227 A1    Feb. 14, 2013

Related U.S. Application Data

(60) Provisional application No. 61/328,049, filed on Apr. 26, 2010.

(51) Int. Cl.
H01M 4/02 (2006.01)
H01M 4/36 (2006.01)
H01M 4/92 (2006.01)

(52) U.S. Cl.
USPC ............................................................ 429/524

(58) Field of Classification Search
None
See application file for complete search history.

(56) References Cited

U.S. PATENT DOCUMENTS

| 4,812,352 A | 3/1989 | Debe |
| 5,039,561 A | 8/1991 | Debe |

(Continued)

FOREIGN PATENT DOCUMENTS

| DE | 10 2009 036361 | 3/2010 |
| EP | 0 552 587 A1 | 7/1993 |

(Continued)

OTHER PUBLICATIONS

Travitsky et al., Pt-, PtNi- and PtCo-supported catalysts for oxygen reduction in PEM fuel cells, Journal of Power Sources, 161 (2006) 782-789, Available online Jun. 27, 2006.*

(Continued)

Primary Examiner — Patrick Ryan
Assistant Examiner — Jose Colucci Rios
(74) Attorney, Agent, or Firm — Gregory D. Allen (57) ABSTRACT

A Pt—Ni catalyst is provided which demonstrates an unusually high oxygen reduction mass activity. In some embodiments, the Pt—Ni catalyst is a Pt—Ni binary alloy. In some embodiments, the catalyst may be characterized as having a Pt fcc lattice parameter of less than 3.71 Angstroms or 0.371 nm. In some embodiments the catalyst has a Pt fcc lattice parameter of between 3.69 Angstroms (or 0.369 nm) and 3.73 Angstroms (or 0.373 nm). In some embodiments, the catalyst may be characterized as having a composition of close to $Pt_xNi_{(1-x)}$, where x is between 0.2 and 0.4. In some embodiments the catalyst comprises nanostructured elements comprising microstructured support whiskers bearing a thin film of nanoscopic catalyst particles comprising a catalyst material described above. The catalyst may be particularly useful as a fuel cell catalyst and more specifically as a fuel cell cathode catalyst.

16 Claims, 7 Drawing Sheets

(56) References Cited

U.S. PATENT DOCUMENTS

| | | | |
|---|---|---|---|
| 5,176,786 | A | 1/1993 | Debe |
| 5,336,558 | A | 8/1994 | Debe |
| 5,338,430 | A | 8/1994 | Parsonage et al. |
| 5,879,827 | A | 3/1999 | Debe et al. |
| 5,879,828 | A | 3/1999 | Debe et al. |
| 6,040,077 | A | 3/2000 | Debe et al. |
| 6,136,412 | A | 10/2000 | Spiewak et al. |
| 6,319,293 | B1 | 11/2001 | Debe et al. |
| 6,482,763 | B2 | 11/2002 | Haugen et al. |
| 7,419,741 | B2 | 9/2008 | Vernstrom et al. |
| 7,622,217 | B2 | 11/2009 | Debe et al. |
| 2007/0082256 | A1 | 4/2007 | Debe et al. |
| 2007/0160899 | A1* | 7/2007 | Atanassova et al. ............ 429/44 |
| 2008/0020261 | A1 | 1/2008 | Hendricks et al. |
| 2008/0118818 | A1 | 5/2008 | Merzougui et al. |
| 2008/0199762 | A1 | 8/2008 | Hayden et al. |
| 2009/0291352 | A1 | 11/2009 | Oshihara |
| 2010/0035124 | A1 | 2/2010 | Thompson et al. |

FOREIGN PATENT DOCUMENTS

| | | |
|---|---|---|
| EP | 2 006 943 A1 | 12/2008 |
| WO | WO 2005/008814 A2 | 1/2005 |
| WO | WO 2006/119147 A2 | 11/2006 |
| WO | WO 2007/075437 A2 | 7/2007 |
| WO | WO 2007/139038 A1 | 12/2007 |

OTHER PUBLICATIONS

Wu et al., PtxNi alloy nanoparticles as cathode catalyst for PEM fuel cells with enhanced catalytic activity, Journal of Alloys and Compounds 488 (2009) 195-198, Available online Aug. 25, 2009.*

Peng et al., Designer platinum nanoparticles: Control of shape, composition in alloy, nanostructure and electrocatalytic property, Nano Today (2009) 4, 143-164, Available online Nov. 4, 2008).*

International Search Report, PCT/US2011/033949, International Filing Date Apr. 26, 2011, 5 pages.

Bai et al.; "Electrochemical Oxidation of Ethanol on Pt-$ZrO_2$/C Catalyst", Electrochemistry Communications, vol. 7, Sep. 6, 2006, pp. 1087-1090.

Benziger et al., "Water Flow in The Gas Diffusion Layer of PEM Fuel Cells", Journal of Membrane Science, 261, 2005, pp. 98-106.

Y. Bing et al; "Nanostructured Pt-alloy Electrocatalysts for PEM Fuel Cell Oxygen Reduction Reaction", Chemical Society Review, vol. 39, Mar. 25, 2010, pp. 2187-2202.

Bonakdarpour A. et al., "Studies of Transition Metal Dissolution From Combinatorially Sputtered, Nanostructured $Pt_{1-x}M_x$ (M = Fe, Ni; 0 < x < 1) Electrocatalysts for PEM Fuel Cells", Journal of The Electrochemical Society, vol. 152, No. 1, 2005, pp. A61-A72.

Bonakdarpour A. et al.; "Dissolution of Transition Metals in Combinatorially Sputtered $Pt_{1-x-y}M_xM_y$ (M, M' = Co, Ni, Mn, Fe) PEMFC Electrocatalysts", Journal of the Electrochemical Society, vol. 153 No. 10, 2006, pp. A1835-A1846.

Borrell, Martine et al; "Study of Silica Supported PtxNi1-x Catalysts by Ion Scattering Spectroscopy", Mikrochimica Acta, vol. 125, No. 1-4, Mar. 1, 1997, pp. 389-393.

J. R. Dahn et al., "Economical Sputtering System to Produce Large-Size Composition-Spread Libraries Having Linear and Orthogonal Stoichiometry Variations", Chem.. Mater. 2002, vol. 14, No. 8, pp. 3519-3523.

Debe M.K. et al.; "Extraordinary Oxygen Reduction Activity of $Pt_3Ni_7$", Journal of the Electrochemical Society, vol. 158, No. 8, Jan. 1, 2011, pp. B910-B918.

Demarconnay et al.; "Study of The Oxygen Electroreduction at Nanostructured PtBi Catalysts in Alkaline Medium", Electrochimica Acta; vol. 53, Jul. 12, 2007, pp. 3232-3241.

Escribano et al., "Characterization of PEMFCs Gas Diffusion Layers Properties", Journal of Power Sources, 156, 2006, pp. 8-13.

Gustavsson et al.; "Thin Film Pt/$TiO_2$ Catalysts for the Polymer Electrolyte Fuel Cell", Journal of Power Sources, vol. 163, Nov. 13, 2006, pp. 671-678.

Igarashi et al.; "CO Tolerance of Pt Alloy Electrocatalysts for Polymer Electrolyte Fuel Cells and The Detoxification Mechanism", Phys. Chem. Chem. Phys., vol. 3, 2001, pp. 306-314.

Janssen et al., Binary Systems of Platinum and a Second Metal as Oxidation Catalysts for Methanol Fuel Cells:, Electrochimica Acta, 1976, vol. 21, pp. 869-878.

Jeyabharathi et al.; "Methanol Tolerant Oxygen-Reduction Activity of Carbon Supported Platinum-Bismuth Bimetallic Nanoparticles", Journal of Applied Electrochem. vol. 39, Jul. 25, 2008, pp. 45-53.

Kang et al.; "Influence of Bi Modification of Pt Anode Catalyst in Direct Formic Acid Fuel Cells", Journal of Phys. Chem. B; vol. 110, Mar. 18, 2006, pp. 7270-7274.

Liu et al.; "Preparation and Electrocatalytic Properties of Pt-$SiO_2$ Nanocatalysts for Ethanol Electrooxidation", Journal of Colloid and Interface Science, vol. 307, Nov. 22, 2006, pp. 139-144.

Maaza et al.; "Thermal Morphological Evolution of Platinum Nano-Particles in Pt-$Al_2O_3$ Nano-Composites", Physics Letters A, vol. 344, Jul. 1, 2005, pp. 57-63.

Mallett, J. J. et al; "Compositional Control In Electrodeposited $Ni_x Pt_{1-x}$ Films", Journal of the Electrochemical Society, vol. 155, No. 1, Jan. 1, 2008, pp. D1-D9.

Meschter et al.; "An Investigation of High Temperature Thermodynamic Properties in The Pt-Zr and Pt-Hf Systems", Metallurgical Transactions A, vol. 8A, Mar. 1977, pp. 503-509.

Moffat, T. P. et al; "Oxygen Reduction Kinetics on Electrodeposited Pt, $Pt_{100-x}Ni_x$, and $Pt_{100-x}Co_x$", Journal of the Electrochemical Society, vol. 156, No. 2, Jan. 1 2009, pp. B238-B251.

Papageorgopoulos et al., "The Inclusion of Mo, Nb and Ta in Pt and PtRu Carbon Supported 3electrocatalysts in the Quest for Improved CO Tolerant PEMFC Anodes", Electrochimica Acta, 48, (2002) pp. 197-204.

Santiago et al., "Carbon-Supported Pt-Co Catalysts Prepared by a Modified Polyol Process As Cathodes for PEM Fuel Cells", J. Phys. Chem. C, vol. 111, Feb. 1, 2007, pp. 3146-3151.

Shim et al.; "Electrochemical Characteristic of Pt-$WO_3$/C and Pt-$TiO_2$/C Electrocatalysts in a Polymer Electrolyte Fuel Cell", Journal of Power Sources, vol. 102, Apr. 6, 2001, pp. 172-177.

D. Thompsett, Handbook of Fuel Cells—Fundamentals, Technology and Applications, Part 1, vol. 3, eds. W. Vielstich, H. A. Gasteiger, A. Lamm, John Wiley and Sons Ltd., 2003, Chapter 37 "Pt Alloys As Oxygen Reduction Catalysts", pp. 467-480.

Tseng et al.; "Characterization of Pt-Cu Binary Catalysts for Oxygen Reduction for Fuel Cell Applications", Materials Chemistry and Physics, vol. 100, Jan. 17, 2006, pp. 385-390.

Uchida et al., "Improved Preparation Process of Very-Low-Platinum-Loading Electrodes for Polymer Electrolyte Fuel Cells", Journal of Electrochem. Soc., vol. 145, No. 11, Nov. 1998, pp. 3708-3713.

Vigier et al.; "Development of Anode Catalysts for a Direct Ethanol Fuel Cell", Journal of Applied Electrochemistry, vol. 34, 2004, pp. 439-446.

Yang X et al; "$Pt_xNi_{1-x}$ Nanoparticles as Catalysts for Hydrogen Generation From Hydrolysis of Ammonia Borane", International Journal of Hydrogen Energy, Elsevier Science Publishers B.V., Barking, GB, Vo. 34, No. 21, Nov. 1, 2009, pp. 8785-8791.

* cited by examiner

PLATINUM NICKEL CATALYST ALLOY

This invention was made with Government support under Cooperative Agreement DE-FG36-07G017007 awarded by DOE. The Government has certain rights in this invention.

FIELD OF THE DISCLOSURE

This disclosure relates to a Pt—Ni catalyst which demonstrates an unusually high oxygen reduction mass activity. The catalyst may be particularly useful as a fuel cell catalyst and more specifically as a fuel cell cathode catalyst.

BACKGROUND OF THE DISCLOSURE

U.S. Pat. No. 5,879,827, the disclosure of which is incorporated herein by reference, discloses nanostructured elements comprising acicular microstructured support whiskers bearing acicular nanoscopic catalyst particles. The catalyst particles may comprise alternating layers of different catalyst materials which may differ in composition, in degree of alloying or in degree of crystallinity.

U.S. Pat. No. 6,482,763, the disclosure of which is incorporated herein by reference, discloses fuel cell electrode catalysts comprising alternating platinum-containing layers and layers containing suboxides of a second metal that display an early onset of CO oxidation.

U.S. Pat. Nos. 5,338,430, 5,879,828, 6,040,077 and 6,319,293, the disclosures of which are incorporated herein by reference, also concern nanostructured thin film catalysts.

U.S. Pat. Nos. 4,812,352, 5,039,561, 5,176,786, and 5,336,558, the disclosures of which are incorporated herein by reference, concern microstructures.

U.S. Pat. No. 7,419,741, the disclosure of which is incorporated herein by reference, discloses fuel cell cathode catalysts comprising nanostructures formed by depositing alternating layers of platinum and a second layer onto a microstructure support, which may form a ternary catalyst.

U.S. Pat. No. 7,622,217, the disclosure of which is incorporated herein by reference, discloses fuel cell cathode catalysts comprising microstructured support whiskers bearing nanoscopic catalyst particles comprising platinum and manganese and at least one other metal at specified volume ratios and Mn content, where other metal is typically Ni or Co.

SUMMARY OF THE DISCLOSURE

This disclosure relates to a Pt—Ni catalyst which demonstrates an unusually high oxygen reduction mass activity. In some embodiments, the Pt—Ni catalyst is a Pt—Ni binary alloy. In some embodiments, the catalyst may be characterized as having a Pt fcc lattice parameter of less than 3.71 Angstroms or 0.371 nm. In some embodiments the catalyst has a Pt fcc lattice parameter of less than 3.72 Angstroms or 0.372 nm. In some embodiments the catalyst has a Pt fcc lattice parameter of less than 3.73 Angstroms or 0.373 nm. In some embodiments the catalyst has a Pt fcc lattice parameter of between 3.69 Angstroms (or 0.369 nm) and 3.73 Angstroms (or 0.373 nm). In some embodiments the catalyst has a Pt fcc lattice parameter of between 3.70 Angstroms (or 0.370 nm) and 3.72 Angstroms (or 0.372 nm). In some embodiments, the catalyst may be characterized as having a composition of close to $Pt_xNi_{(1-x)}$, where x is between 0.2 and 0.4. In some embodiments x is between 0.21 and 0.34. In some embodiments x is between 0.22 and 0.38. In some embodiments x is between 0.22 and 0.33. In some embodiments x is between 0.26 and 0.33. In some embodiments x is between 0.28 and 0.32.

In some embodiments the catalyst comprises nanostructured elements comprising microstructured support whiskers bearing a thin film of nanoscopic catalyst particles comprising a catalyst material described above.

The catalyst may be particularly useful as a fuel cell catalyst and more specifically as a fuel cell cathode catalyst.

In this application:

"membrane electrode assembly" means a structure comprising a membrane that includes an electrolyte, typically a polymer electrolyte, and at least one but more typically two or more electrodes adjoining the membrane;

"nanostructured element" means an acicular, discrete, microscopic structure comprising a catalytic material on at least a portion of its surface;

"nanoscopic catalyst particle" means a particle of catalyst material having at least one dimension equal to or smaller than about 15 nm or having a crystallite size of about 15 nm or less, as measured from diffraction peak half widths of standard 2-theta x-ray diffraction scans;

"thin film of nanoscopic catalyst particles" includes films of discrete nanoscopic catalyst particles, films of fused nanoscopic catalyst particles, and films of nanoscopic catalyst grains which are crystalline or amorphous; typically films of discrete or fused nanoscopic catalyst particles, and most typically films of discrete nanoscopic catalyst particles;

"acicular" means having a ratio of length to average cross-sectional width of greater than or equal to 3;

"discrete" refers to distinct elements, having a separate identity, but does not preclude elements from being in contact with one another;

"microscopic" means having at least one dimension equal to or smaller than about a micrometer;

"planar equivalent thickness" means, in regard to a layer distributed on a surface, which may be distributed unevenly, and which surface may be an uneven surface (such as a layer of snow distributed across a landscape, or a layer of atoms distributed in a process of vacuum deposition), a thickness calculated on the assumption that the total mass of the layer was spread evenly over a plane covering the same area as the projected area of the surface (noting that the projected area covered by the surface is less than or equal to the total surface area of the surface, once uneven features and convolutions are ignored);

"bilayer planar equivalent thickness" means the total planar equivalent thickness of a first layer (as described herein) and the next occurring second layer (as described herein).

It is an advantage of the present disclosure to provide catalysts for use in fuel cells.

DETAILED DESCRIPTION

The present disclosure provides a Pt—Ni catalyst which demonstrates an unusually high oxygen reduction mass activity. In some embodiments, the catalyst may be characterized as having Pt fcc lattice parameter of less than 3.71 Angstroms. In some embodiments, the catalyst may be characterized as having a composition of close to $Pt_xNi_{(1-x)}$, where x is between 0.2 and 0.4. The catalyst may be particularly useful as a fuel cell catalyst and more specifically as a fuel cell cathode catalyst.

This disclosure describes a specific Pt alloy crystal structure and lattice parameter that gives a significant increase in oxygen reduction activity when used as a fuel cell cathode catalyst. The activity with a PtNi alloy having a high atomic percentage of Ni is seen to dramatically increase as the atomic percentage changes over a very small range of about 60% to about 65% as measured by electron microprobe, or 65% to about 73% as measured gravimetrically (preferred), or 73% to about 78% as determined by X-ray fluorescence, and the fcc lattice parameter drops below 3.71 Angstroms. The low value of the lattice parameter is believed to be critical.

This disclosure, demonstrated with a PtNi binary alloy, allows the oxygen reduction activity to be doubled over standard catalyst compositions, e.g., NSTF $Pt_{68.7}Co_{28.5}Mn_{2.7}$ ternary catalyst. The current mass activity value measured with the new PtNi alloy at a lattice parameter of ~3.71 Angstroms, is 0.32 $A/mg_{Pt}$, using only 0.10 $mg_{Pt}/cm^2$.

This disclosure has the potential to double the current best NSTF catalyst ORR activity, thereby directly improving high current density performance and ultimately the stack size and costs, the operating efficiency at low power operating conditions and hence vehicle fuel efficiency, and indirectly affect other factors such as water management and break-in conditioning.

Objects and advantages of this disclosure are further illustrated by the following examples, but the particular materials and amounts thereof recited in these examples, as well as other conditions and details, should not be construed to unduly limit this disclosure.

EXAMPLES

Unless otherwise noted, all reagents were obtained or are available from Aldrich Chemical Co., Milwaukee, Wis., or may be synthesized by known methods.

Pt binary and ternary alloys of varying compositions described below were made by sputter deposition of individual multi-layers of the respective elements onto NSTF whisker support films, as described in the prior art cited above, e.g., U.S. Pat. No. 7,419,741. The catalysts were applied to proton exchange membranes having an equivalent weight of approximately 850, and a thickness of 20 microns. On the anode side, the catalyst loading was generally 0.05 or 0.1 $mg-Pt/cm^2$ of PtCoMn in the composition $Pt_{68.7}Co_{28.5}Mn_{2.7}$. On the cathode side, the Pt loading in the various alloys was 0.10 $mg/cm^2$ for most of the data below, and 0.15 $mg/cm^2$ of Pt for four of the PtNi examples. The catalysts were transferred to the surface of the membrane by hot roll lamination, and the subsequent catalyst coated membranes tested in 50 $cm^2$ fuel cells after addition of gas diffusion layers. The cathode catalysts' activities for oxygen reduction were measured according to protocols specified by the Dept. of Energy.

Figure 4:
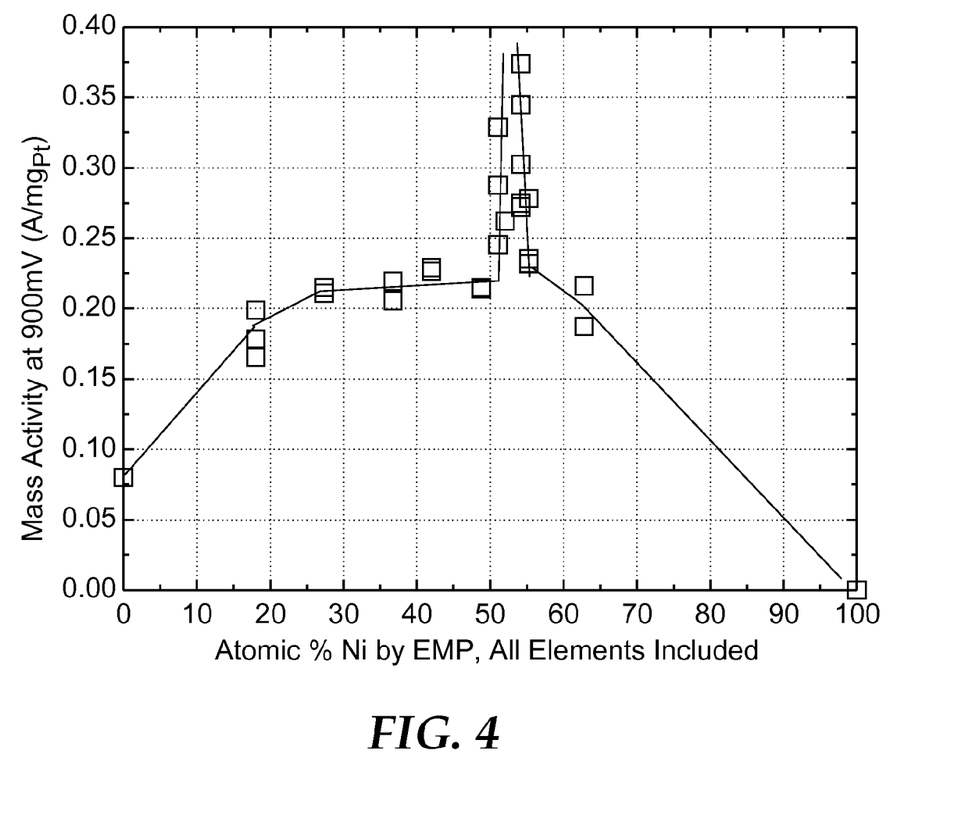
FIG. 4 is a graph of fuel cell mass activity measured in a fuel cell versus atomic percentage Ni in a series of $Pt_xNi_y$ alloy compositions, as measured by EMP, and accounting for all elements detected, including oxygen.
Figure 5:
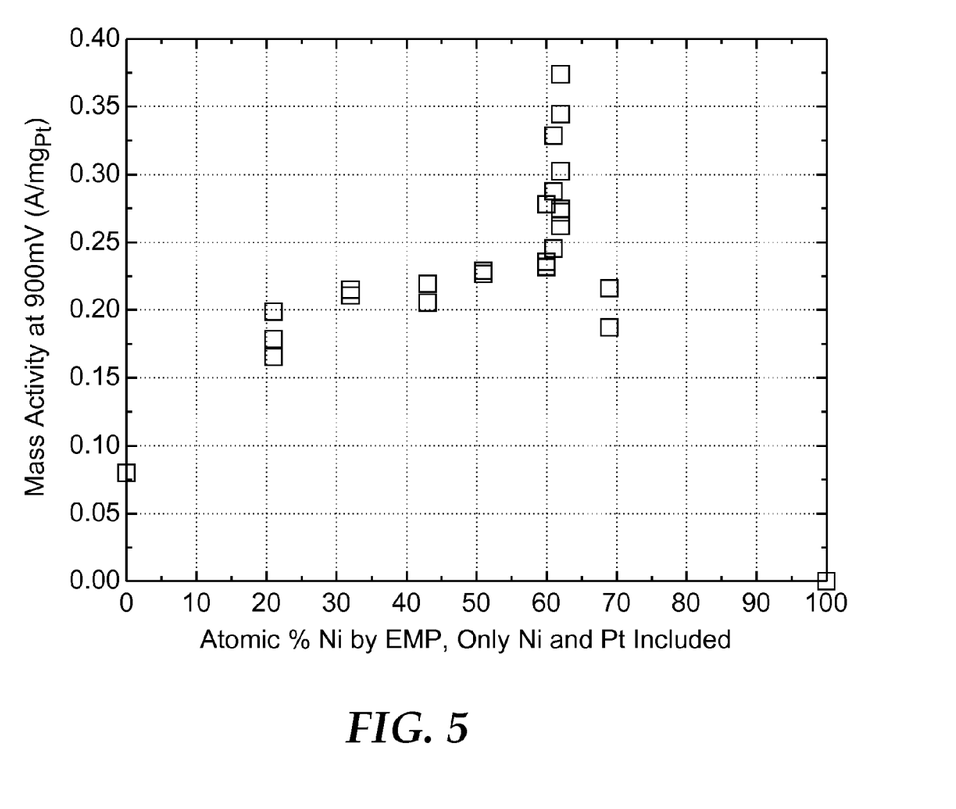
FIG. 5 is a graph of fuel cell mass activity measured in a fuel cell versus atomic percentage of Ni in a series of $Pt_xNi_y$ alloy compositions, as measured by EMP, and accounting for just the Ni and Pt.

The catalyst alloy compositions were determined by multiple methods, including the initial sputter deposition calibration files (designated as gravimetric in FIG. 7), or by x-ray fluorescence (designated as XRF in FIG. 6), or by electron microprobe analyses (designated as EMP in FIGS. 4 and 5).

The catalyst alloy structural properties were measure by X-ray diffraction (XRD) before the catalysts were applied to the membranes and tested in fuel cells.

Figure 1:
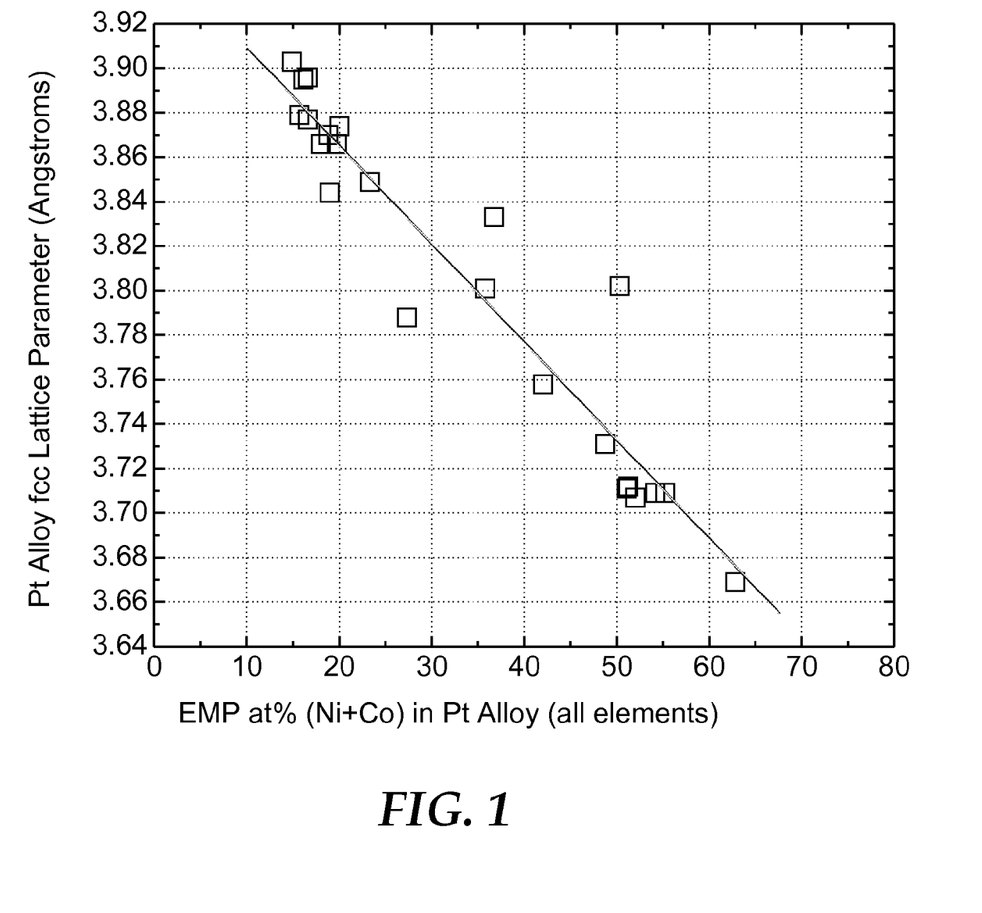
FIG. 1 is a graph of Pt alloy fcc lattice parameter, as measured by electron microprobe analysis (XRD), versus the combined atomic percentages of Co and Ni, for a variety of ternary Pt alloys.

FIG. 1 is a graph of Pt alloy fcc lattice parameter, as measured by electron microprobe analysis (XRD), versus the combined atomic percentages of Co and Ni, for a variety of ternary Pt alloys. A linear best-fit line is also shown. It is seen that the Pt face centered cubic lattice parameter decreases monotonically as the amount of transition metal increases in the alloy.

Figure 2:
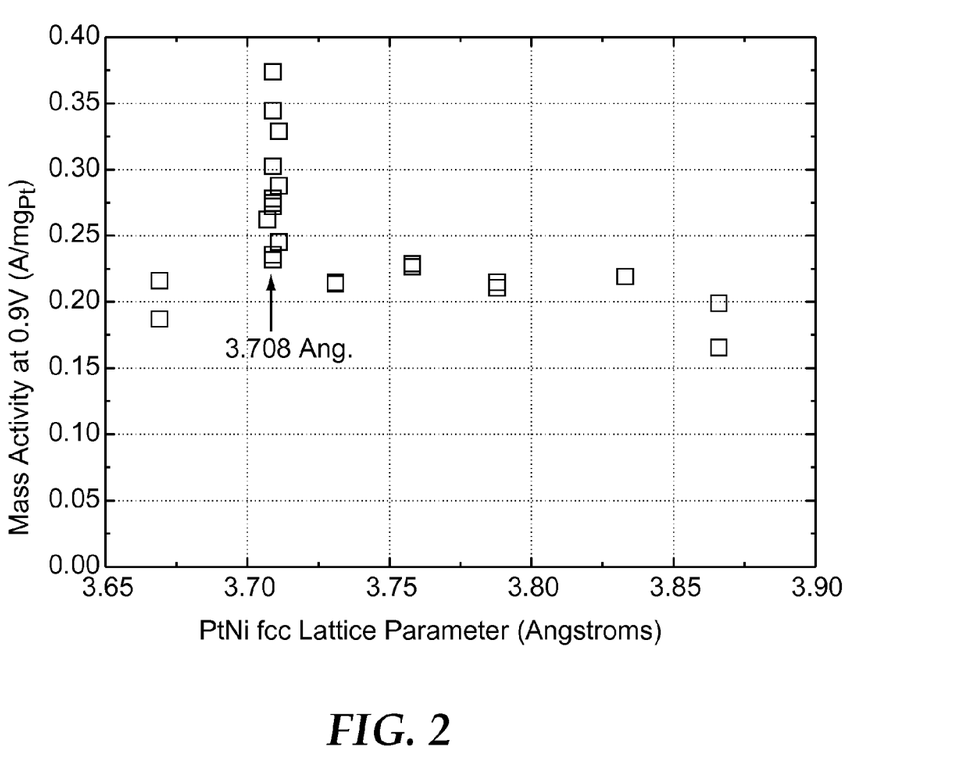
FIG. 2 is a graph of measured oxygen reduction mass activity versus PtNi fcc lattice parameter, as measured by electron microprobe analysis (XRD), for a series of PtNi binary catalysts.

FIG. 2 is a graph of measured oxygen reduction mass activity versus PtNi fcc lattice parameter, as measured by electron microprobe analysis (XRD), for a series of PtNi binary catalysts. FIG. 2 shows a dramatic peak at a PtNi fcc lattice parameter of approximately 3.71 Angstroms.

Figure 3:
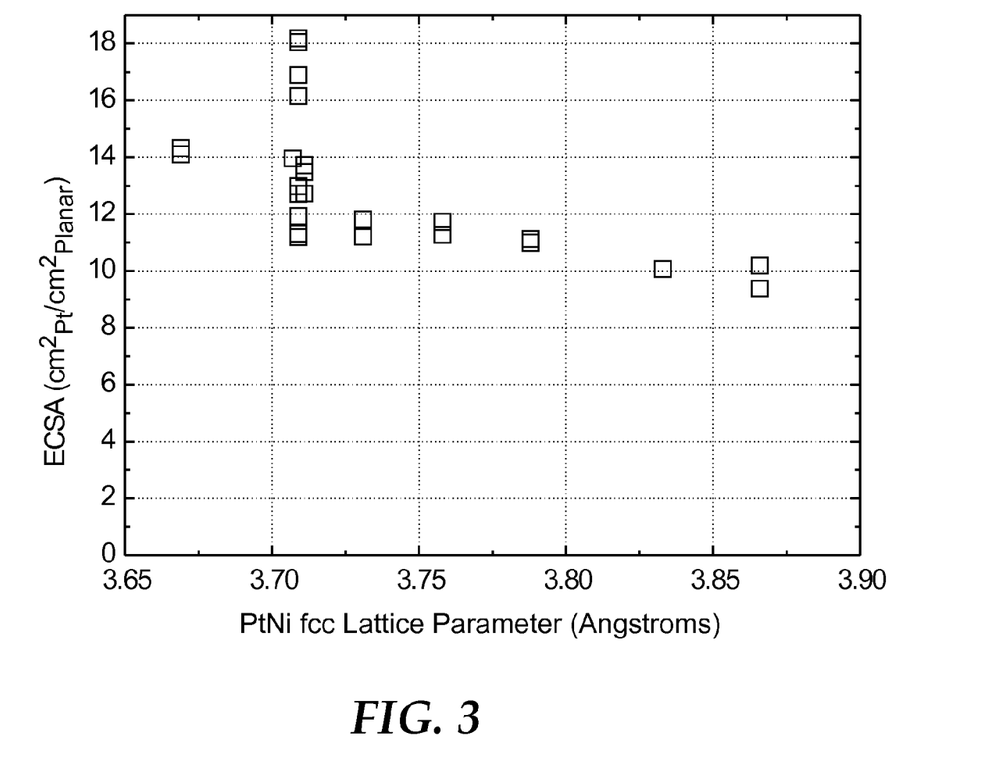
FIG. 3 is a graph of measured electrochemical surface area, measured in a fuel cell. versus PtNi fcc lattice parameter, as measured by electron microprobe analysis (XRD), for a series of PtNi binary catalysts.

FIG. 3 is a graph of measured electrochemical surface area, measured in a fuel cell, versus PtNi fcc lattice parameter, as measured by electron microprobe analysis (XRD), for a series of PtNi binary catalysts. FIG. 3 also shows a dramatic peak at a PtNi fcc lattice parameter of approximately 3.71 Angstroms FIG. 3 shows that the electrochemical surface area, measured in the fuel cell by conventional $H_{upd}$ methods, peaks at this lattice parameter.

Figure 6:
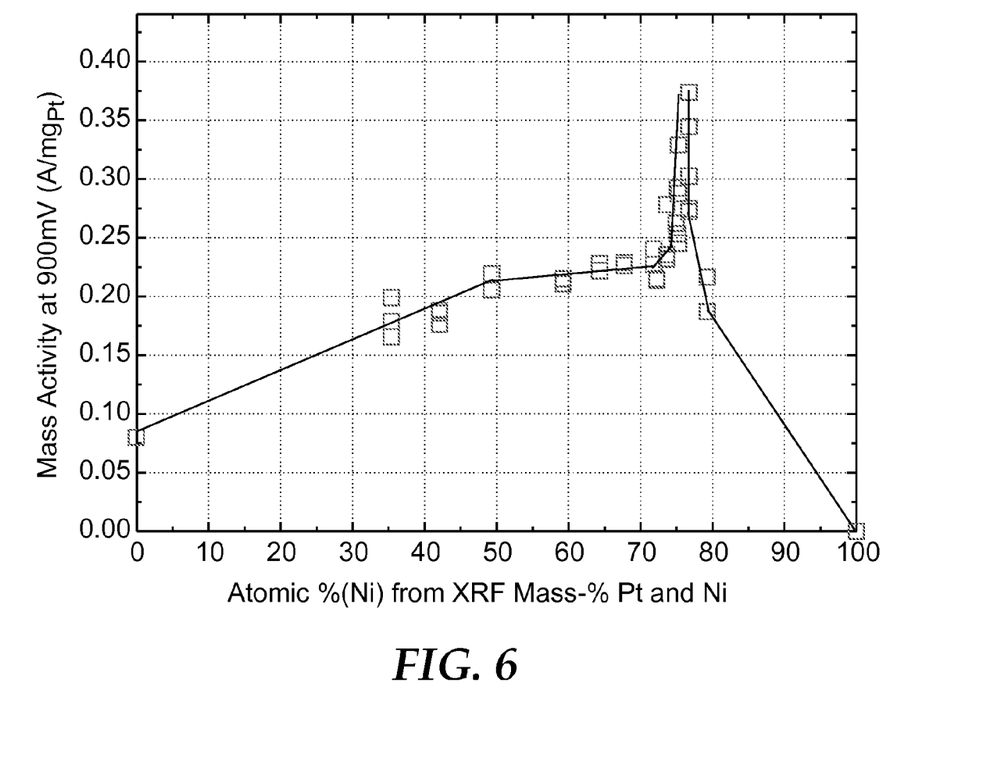
FIG. 6 is a graph of fuel cell mass activity measured in a fuel cell versus atomic percentage of Ni in a series of $Pt_xNi_y$ alloy compositions, as measured by XRF.

FIG. 4 is a graph of fuel cell mass activity measured in a fuel cell versus atomic percentage Ni in a series of $Pt_xNi_y$ alloy compositions, as measured by EMP, and accounting for all elements detected, including oxygen. FIG. 5 is a graph of fuel cell mass activity measured in a fuel cell versus atomic percentage of Ni in a series of $Pt_xNi_y$ alloy compositions, as measured by EMP, and accounting for just the Ni and Pt. FIG. 6 is a graph of fuel cell mass activity measured in a fuel cell versus atomic percentage of Ni in a series of $Pt_xNi_y$ alloy compositions, as measured by XRF. It is seen that there is a sharp peak in the mass activity as a function of composition, but the apparent position of the peak with respect to % Ni, depends on the technique used to measure it and assumptions made. However, the most likely relative Ni/Pt composition value of corresponding to the peak in mass activity is that it is close to the 62% atomic percent Ni.

Figure 7:
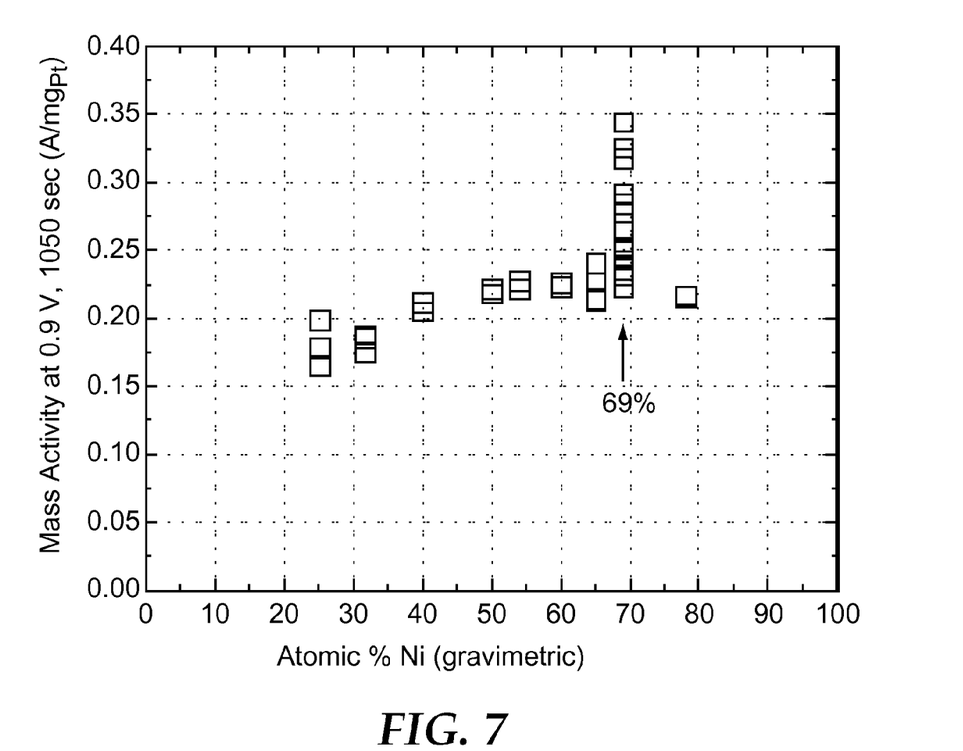
FIG. 7 is a graph of fuel cell mass activity measured in a fuel cell versus atomic percentage Ni in a series of $Pt_xNi_y$ alloy compositions, as measured by gravimetric means.

FIG. 7 is a graph of fuel cell mass activity measured in a fuel cell versus atomic percentage Ni in a series of $Pt_xNi_y$ alloy compositions, as measured by gravimetric means. The gravimetric method is not as precise (±5%), but may be more accurate and hence shows the peak as closer to the $Pt_{30}Ni_{70}$ composition Various modifications and alterations of this disclosure will become apparent to those skilled in the art without departing from the scope and principles of this disclosure, and it should be understood that this disclosure is not to be unduly limited to the illustrative embodiments set forth hereinabove.

We claim:

1. A catalyst comprising nanostructured elements comprising microstructured support whiskers bearing a thin film of nanoscopic catalyst particles comprising a catalyst material according to the formula $Pt_xNi_{(1-x)}$ where x is between 0.21 and 0.39.

2. The catalyst according to claim 1 wherein x is between 0.21 and 0.34.

3. The catalyst according to claim 1 wherein x is between 0.22 and 0.38.

4. The catalyst according to claim 1 wherein x is between 0.22 and 0.33.

5. The catalyst according to claim 1 wherein x is between 0.26 and 0.33.

6. The catalyst according to claim 1 wherein x is between 0.28 and 0.32.

7. The catalyst according to claim 1 having a Pt fcc lattice parameter of less than 3.73 Angstroms.

8. The catalyst according to claim 1 having a Pt fcc lattice parameter of less than 3.72 Angstroms.

9. The catalyst according to claim 1 having a Pt fcc lattice parameter of less than 3.71 Angstroms.

10. The catalyst according to claim 1 having a Pt fcc lattice parameter of between 3.69 and 3.73 Angstroms.

11. The catalyst according to claim 1 having a Pt fcc lattice parameter of between 3.70 and 3.72 Angstroms.

12. A catalyst comprising nanostructured elements comprising microstructured support whiskers bearing a thin film of nanoscopic catalyst particles comprising a catalyst material which is a PtNi binary alloy having a Pt fcc lattice parameter of between 3.69 and 3.73 Angstroms.

13. The catalyst according to claim 12 having a Pt fcc lattice parameter of between 3.70 and 3.72 Angstroms.

14. The catalyst according to claim 1 which is a fuel cell catalyst.

15. A fuel cell membrane electrode assembly comprising the catalyst of claim 1.

16. A fuel cell membrane electrode assembly comprising a cathode catalyst which is the catalyst of claim 1.

* * * * *

UNITED STATES PATENT AND TRADEMARK OFFICE
CERTIFICATE OF CORRECTION

PATENT NO. : 8,557,484 B2
APPLICATION NO. : 13/643353
DATED : October 15, 2013
INVENTOR(S) : Mark Kevitt Debe et al.

It is certified that error appears in the above-identified patent and that said Letters Patent is hereby corrected as shown below:

On the Title Page

Page 2, Column 2 Item -56- (Other Publications)
Line 43, delete "Characteristic" and insert -- Characteristics --, therefor.

In the Specification

Column 2
Line 65, delete "cell." and insert -- cell, --, therefor.

Signed and Sealed this
Eighth Day of April, 2014

Michelle K. Lee
*Deputy Director of the United States Patent and Trademark Office*